United States Patent [19]
Hogge et al.

[11] Patent Number: 5,983,194
[45] Date of Patent: Nov. 9, 1999

[54] PLANNING COORDINATION SYSTEMS FOR COORDINATING SEPARATE FACTORY PLANNING SYSTEMS AND A METHOD OF OPERATION

[75] Inventors: John C. Hogge, Richardson; Brian M. Kennedy, Coppell; Lamott G. Oren, Dallas, all of Tex.

[73] Assignee: i2 Technologies, Inc., Dallas, Tex.

[21] Appl. No.: 08/805,683

[22] Filed: Feb. 25, 1997

Related U.S. Application Data

[63] Continuation of application No. 08/314,072, Sep. 28, 1994, abandoned.

[51] Int. Cl.[6] .................................................. G06F 17/60
[52] U.S. Cl. ........................... 705/7; 705/8; 364/468.03; 364/468.24
[58] Field of Search .................................. 705/1, 7, 8, 9, 705/11, 28, 29; 364/468.01, 468.02, 468.03, 468.05, 468.06, 468.24

[56] References Cited

U.S. PATENT DOCUMENTS

| | | |
|---|---|---|
| 4,209,845 | 6/1980 | Berger et al. . |
| 4,611,280 | 9/1986 | Linderman . |
| 4,611,310 | 9/1986 | Durbin ..................................... 365/230 |
| 4,827,423 | 5/1989 | Beasley et al. .......................... 364/468 |
| 5,089,970 | 2/1992 | Lee et al. ................................. 364/468 |
| 5,128,861 | 7/1992 | Kagami et al. . |
| 5,148,370 | 9/1992 | Litt et al. ................................. 364/468 |
| 5,175,857 | 12/1992 | Inoue ....................................... 395/800 |
| 5,193,143 | 3/1993 | Kaemmerer et al. ..................... 395/51 |
| 5,216,612 | 6/1993 | Cornett et al. ........................... 364/468 |
| 5,218,700 | 6/1993 | Beechick ................................ 395/700 |
| 5,233,533 | 8/1993 | Edstrom et al. ......................... 364/468 |
| 5,241,465 | 8/1993 | Oba et al. ................................ 364/401 |
| 5,268,838 | 12/1993 | Ito ............................................ 345/358 |
| 5,280,425 | 1/1994 | Hogge ..................................... 364/402 |
| 5,303,144 | 4/1994 | Kawashima et al. .................... 364/401 |
| 5,311,438 | 5/1994 | Sellers et al. ....................... 364/468.02 |
| 5,321,605 | 6/1994 | Chapman et al. ........................... 705/7 |
| 5,369,570 | 11/1994 | Parad ....................................... 364/401 |
| 5,657,453 | 8/1997 | Taoka et al. ................................ 705/1 |

FOREIGN PATENT DOCUMENTS

| | | |
|---|---|---|
| 0231552A1 | of 0000 | European Pat. Off. . |
| 0466089A2 | of 0000 | European Pat. Off. . |
| 0466090A2 | of 0000 | European Pat. Off. . |
| 025405A | 8/1990 | European Pat. Off. . |

*Primary Examiner*—Joseph Thomas
*Attorney, Agent, or Firm*—Baker & Botts, L.L.P.

[57] ABSTRACT

A planning coordination system (30) and method are provided that automatically coordinate a planning system (32) associated with a first factory (28) with separate planning systems (16, 24, 40) of a plurality of factories (12, 20, 36) in a manufacturing chain. The planning coordination system (30) communicates with the planning system (32) of the first factory (28) and communicates with separate planning coordination systems (14, 38) of the other factories (12, 36) with which the first factory (28) has demand and supply part relationships. The planning coordination system (30) receives and processes demands and responses communicated by the planning coordination systems (14, 38) of the other factories (12, 36). The planning coordination system (30) provides planning information to the planning system (32) of the first factory (28) and obtains information about products to be produced and parts needed from an output plan (34) of that planning system (32). The planning coordination system (30) communicates responses to the planning coordination system (14) of each factory (12) from which a demand was received in order to provide supply part information and communicates a demand to the planning coordination system (38) of each factory (36) from which parts are needed in order to provide demand part information. The planning coordination system (30) repeats receiving, processing, providing, obtaining and communicating such that the planning system (32) of the first factory (30) can adjust the output plan (34) responsive to the demands and responses communicated between the first factory (28) and the other factories (12, 36).

18 Claims, 3 Drawing Sheets

PLANNING COORDINATION SYSTEMS FOR COORDINATING SEPARATE FACTORY PLANNING SYSTEMS AND A METHOD OF OPERATION

CROSS REFERENCE TO RELATED APPLICATIONS

This application is a continuation of application Ser. No. 08/314,072, filed Sep. 28, 1994, now abandoned.

TECHNICAL FIELD OF THE INVENTION

This invention relates in general to the field of electronic systems, and more particularly to planning coordination systems for coordinating separate factory planning systems and a method of operation.

BACKGROUND OF THE INVENTION

Manufacturing plants or factories often utilize some form of planning system to prepare plans or schedules for the manufacturing process. A planning system can range from a manually prepared plan or schedule to a plan or schedule automatically generated by a software application operating on a computer system. One commercially available software application that operates as a planning system is RHYTHM™ MPPS available from i2 Technologies, Inc. of Dallas, Tex. A planning system operates to integrate orders for products, available raw materials, and needed parts from other vendors into a plan or schedule defining dates for production and shipment of products.

It is important to the operation of a factory that its plan be as efficient as possible despite the large number of variables involved. It is difficult for a planning system sufficiently to monitor all manufacturing variables, including such things as delays or shortages from vendors and equipment failures, to maintain the efficiency of the factory's plan. Conventional planning systems are unable efficiently to maintain a plan for a factory accurately reflecting all orders received from customers, the present state of raw materials and inventory and the parts available from other factories from which the factory receives parts.

SUMMARY OF THE INVENTION

A need has arisen for having planning coordination systems that operate to coordinate factories having demand and supply part relationships with the other factories in the manufacturing chain.

In accordance with the present invention, planning coordination systems for coordinating separate factory planning systems and a method of operation are provided that substantially eliminates or reduces disadvantages and problems associated with conventional factory planning systems.

According to one aspect of the present invention, a planning coordination system automatically coordinates a planning system associated with a first factory with separate planning systems of a plurality of factories in a manufacturing chain. The planning coordination system communicates with the planning system of the first factory and communicates with separate planning coordination systems of the other factories with which the first factory has demand and supply part relationships. The planning coordination system receives and processes demands and responses communicated by the planning coordination systems of the other factories. The planning coordination system provides planning information to the planning system of the first factory and obtains information about products to be produced and parts needed from an output plan of that planning system. The planning coordination system communicates responses to the planning coordination system of each factory from which a demand was received in order to provide supply part information and communicates a demand to the planing coordination system of each factory from which parts are needed in order to provide demand part information. The planning coordination system repeats receiving, processing, providing, obtaining and communicating such that the planning system of the first factory can adjust the output plan responsive to the demands and responses communicated between the first factory and the other factories.

BRIEF DESCRIPTION OF THE DRAWINGS

A more complete understanding of the present invention and advantages thereof may be acquired by reference to the following description taken in conjunction with the accompanying drawings in which like reference numbers indicate like features and wherein.

DETAILED DESCRIPTION OF THE INVENTION

Figure 1:
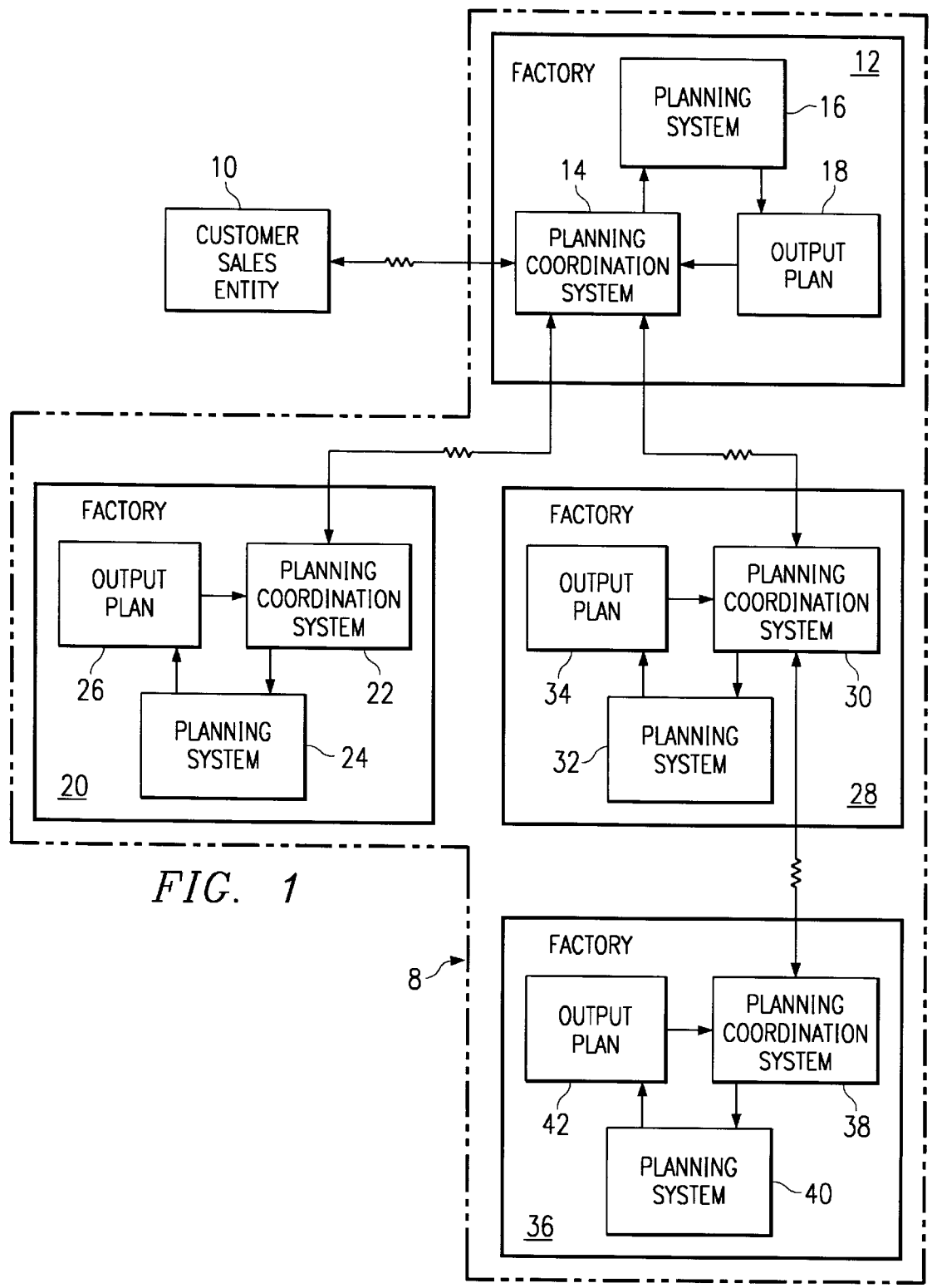
FIG. 1 illustrates a factory network utilizing planning coordination systems constructed according to the teachings of the present invention.

FIG. 1 illustrates a factory network, indicated generally at 8, having a plurality of coordinated factories each utilizing a planning coordination system constructed according to the teachings of the present invention. Factory network 8 supplies products to a customer sales entity 10. Customer sales entity 10 represents all post-manufacturing activity such as distribution, wholesale activities, and retail sales activity. Factory network 8 is coupled to customer sales entity 10. Customer sales entity 10 can communicate demands for products to factory network 8, and factory network 8 can communicate responses indicating when products will be supplied to customer sales entity 10.

Factory network 8 comprises a first factory 12. Factory 12 includes a planning coordination system 14 coupled to customer sales entity 10. Factory 12 also includes a planning system 16 coupled to planning coordination system 14. An output plan 18 is coupled to planning coordination system 14 and planning system 16. Factory network 8 comprises three additional factories that supply factory 12 as shown.

A second factory 20 comprises a planning coordination system 22 coupled to planning coordination system 14 of factory 12. Factory 20 also includes a planning system 24 coupled to planning coordination system 22. Factory 20 further includes an output plan 26 coupled to planning coordination system 22 and to planning system 24.

Factory network 8 further includes a third factory 28. Factory 28 comprises a planning coordination system 30 coupled to planning coordination system 14 of factory 12. Factory 28 also includes a planning system 32 coupled to planning coordination system 30. An output plan 34 is coupled to planning coordination system 30 and to planning system 32.

Factory network 8 comprises a fourth factory 36. Factory 36 includes a planning coordination system 38 coupled to planning coordination system 30 of factory 28. Factory 36 includes a planning system 40 coupled to planning coordination system 38. Factory 36 further includes an output plan 42 coupled to planning coordination system 38 and to planning system 40.

Factory network 8 comprises three levels of factories as shown. Factory 12 is in the first level and directly supplies customer sales entity 10. Factory 20 and factory 28 are in the second level, and both supply factory 12. Factory 36 is the only factory in the third level. Factory 36 supplies factory 28 in the second level. The factories may comprise separate physical plants, separately planned parts of one plant or a combination thereof. The only requirement is that each factory have a planning system and output plan of some sort. The number of factories and relationships between them illustrated in FIG. 1 is not intended to limit the scope of the present invention. The teachings of the present invention are applicable to a factory network having any number of separate physical factories or separately planned portions of one plant. Further, factories can demand from and supply to each other and are not required to be separated into levels. In addition, customer sales entity 10 could demand from any or all factories in the factory network rather than only from one factory as shown in FIG. 1. The factories and relationships shown in FIG. 1 are chosen for purposes of description only.

Factory network 8 operates to manufacture a product in quantities sufficient to supply demands from customer sales entity 10. Customer sales entity 10 communicates demands for products to factory network 8 that are received and directly supplied by factory 12. A demand generally includes such information as a part number, quantity needed, and a due date. Planning coordination system 14 in factory 12 operates to receive and communicate responses to the demands from customer sales entity 10.

Planning coordination system 14 collects and analyzes demands received from customer sales entity 10. Planning coordination system 14 then provides information to planning system 16 such as product numbers, quantities ordered and due dates. Planning system 16 utilizes the information received from planning coordination system 14 to generate adjustments to output plan 18 to accommodate supplying the demands. Output plan 18 comprises a plan for the manufacturing activity of factory 12 including dates for receipt of necessary parts and for completion and shipment of manufactured products. Planning system 16 operates both to prepare and to adjust output plan 18. Planning system 16 initially utilizes assumed lead times for any parts factory 12 must acquire from factory 20 and factory 28. When adjusting output plan 18 prior to receiving responses from factory 20 and factory 28, planning system 16 assumes parts will be supplied on dates according to these assumed lead times. Output plan 18, as adjusted, is provided to planning coordination system 14.

Planning coordination system 14 determines from output plan 18 how to respond to each demand received from customer sales entity 10. Each response should include such information as the part number, quantity promised, and date promised. Planning coordination system 14 operates to generate and communicate responses to customer sales entity 10. Planning coordination system 14 also determines from output plan 18 what parts need to be ordered from factory 20 or factory 28 to manufacture the products to be supplied to customer sales entity 10. Planning coordination system 14 then communicates demands to factory 20 and to factory 28 for those parts needed. All demands communicated between factories in factory network 8 include such information as a part number, quantity needed, and due date.

Factory 20 and factory 28 operate in a manner similar to factory 12 in responding to demands received from factory 12. Planning coordination system 22 of factory 20 receives demands from planning coordination system 14 of factory 12 and processes those demands. Planning coordination system 22 provides planning system 24 with information required to adjust output plan 26 to accommodate supplying parts to factory 12. Planning system 24 then processes this information and adjusts output plan 26 to provide for supplying the requested parts. These adjustments to output plan 26 are monitored by planning coordination system 22. Planning coordination system 22 operates to generate and communicate responses to planning coordination system 14 of factory 12. All responses communicated between factories in factory network 8 include such information as part number, quantity promised, and date promised.

Factory 28 also operates to supply parts to factory 12. Factory 28 is coupled to factory 36 because factory 28 requires parts from factory 36 in order to manufacture the parts demanded by factory 12. Planning coordination system 30 of factory 28 receives demands from factory 12 and processes the demands. Planning coordination system 30 provides information to planning system 32 necessary to adjust for the demands. Planning system 32 then adjusts output plan 34 to accommodate supplying the parts demanded by factory 12. Planning system 32 initially assumes a lead time for the parts needed from factory 36 as described with respect to factory 12. Planning coordination system 30 processes the adjustments to output plan 34 and communicates a response to planning coordination system 14 of factory 12 and communicates demands to factory 36 for needed parts.

Factory 36 operates to supply factory 28. Planning coordination system 38 of factory 36 receives demands from factory 28 and processes those demands. Planning coordination system 38 then provides information to planning system 40 such that planning system 40 can adjust output plan 42. Planning coordination system 38 processes the adjustments to output plan 42 and generates and communicates a response to factory 28.

Factory network 8 is coordinated by the operation of each planning coordination system according to the teachings of the present invention. Iterations of the planning process produces an increasingly refined output plan for each factory. The factories in factory network 8 are enabled more efficiently to prepare output plans for manufacturing activity. The planning coordination systems allow factory network 8 to utilize accurate information as to availability of parts, production facilities, and production capacity at any given point in time. This coordination of factories in a factory network is a technical advantage of the present invention and provides more efficient generation of plans and schedules for the coordinated factories.

Planning coordination systems constructed according to the teachings of the present invention operate to coordinate separate planning systems through data communication between the planning coordination systems. The planning coordination systems comprise software systems operating on computer hardware systems operable to access data held in data storage devices, move data info processing memory and perform processing steps on the data. In one embodiment of the present invention, data communication by planning coordination systems, comprises ASCII data files where the data communications include demand and supply information for each factory. Coordination of factories into a factory network allows each factory to request parts from other factories and for each plant to respond to requests from other factories. In one embodiment of the present invention, requests contain a part number, quantity needed, and due date, and responses include a part number, quantity supplied, and promise date.

The division of the factory network into separate factories is arbitrary from the standpoint of the planning coordination system at each factory. Typical divisions are by factory location, product group, machine group, or other logical combination. These divisions often naturally exist in a manufacturing environment. A factory or group of factories can continue to plan the natural divisions separately by deploying multiple planning systems interlinked by multiple planning coordination systems rather than consolidating into one planning system. A factory network having planning coordination systems is particularly desirable where the size of the factory network requires distributed processing to achieve desired performance levels, the expense of consolidating multiple factory information into one planning system is prohibitive, organizational constraints within the factory network would make it difficult to consolidate the planning personnel of multiple factories, and one company wants to coordinate plans with the plans of vendors or customers.

Figure 2:
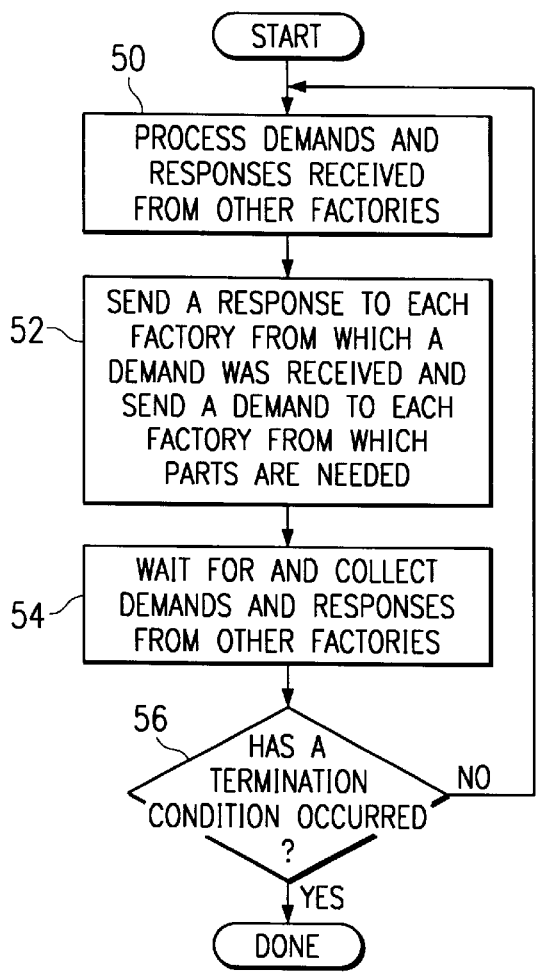
FIG. 2 illustrates a flow chart of a method of operation of a planning coordination system according to the teachings of the present invention.

FIG. 2 illustrates a flow chart of a method of operation of a planning coordination system according to the teachings of the present invention. The planning coordination system in each factory illustrated in FIG. 1 operates according to the flow chart illustrated in FIG. 2.

Initially in step 50, the planning coordination system processes demands and responses received from other factories. Processing of demands and responses is described in more detail with respect to the flow chart illustrated in FIG. 3. Generally, each response is processed to determine whether it is adequate, and each demand is processed to determine what parts are needed and what response can be given.

In step 52, the planning coordination system communicates a response to each factory from which a demand was received and communicates a demand to each factory from which parts are needed. Each response is generated by accessing information from the factory's output plan as to adjustments made to accommodate supplying the associated demand. An initial response communicated by a planning coordination system provides promise dates generated utilizing assumed lead times for any parts that must be requested from other factories. Each demand is generated to request those parts needed to produce the parts promised in a response.

The planning coordination system waits for and collects demands and responses from other factories in step 54. This step of waiting and collecting is described in more detail with respect to the flow chart illustrated in FIG. 4.

In step 56, the planning coordination system checks whether a termination condition has occurred. If a termination condition has occurred, then the planning coordination system is completed with coordination activity. Otherwise, the planning coordination system returns to step 50. There are a number of possible termination conditions. In general, it is desired for some condition to operate as a termination condition for the planning coordination system such that a user can access the planning coordination system, output plan and planning system in a manual mode. In one embodiment of the present invention, termination conditions include: (a) a maximum number of iterations by the planning coordination system, (b) iterating until no factory communicates part demands that differ from previous demands, and (c) stopping operation at a given time of day. Of course, other similar, suitable termination conditions are possible.

Figure 3:
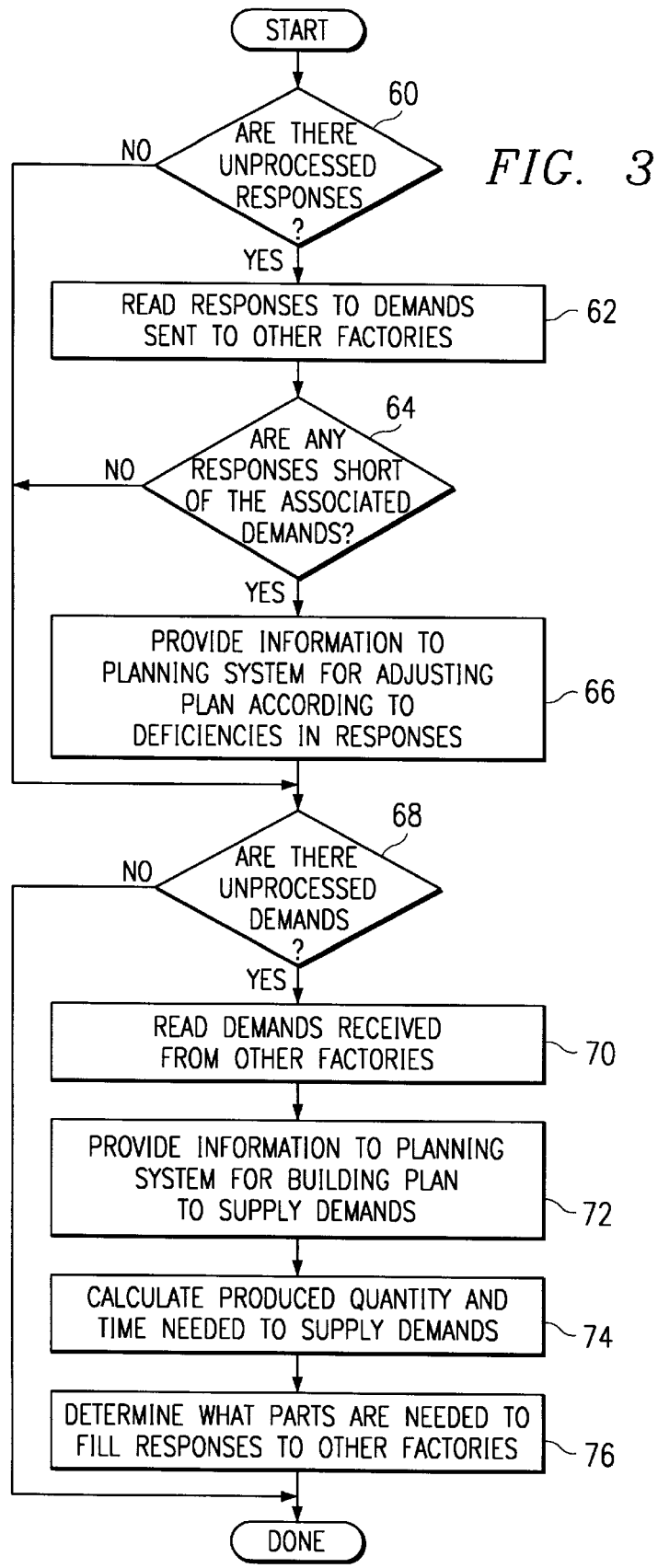
FIG. 3 illustrates a flow chart of a method of processing demands and responses received from other factories according to the teachings of the present invention.

FIG. 3 illustrates a flow chart of a method of processing demands and responses according to the teachings of the present invention. The flow chart of FIG. 3 illustrates in more detail step 50 of FIG. 2. In step 60, the planning coordination system checks whether there are unprocessed responses. If there are no unprocessed responses, then the planning coordination system continues at step 68. If there are unprocessed responses, the planning coordination system continues at step 62.

In step 62, the planning coordination system reads the responses to demands that have been communicated to other factories. In step 64, the planning coordination system determines whether any responses are short of the associated demands. If none are short, the planning coordination system continues at step 68. Otherwise, the planning coordination system provides information to the planning system for adjusting the output plan according to deficiencies in the responses.

There are a number of possible adjustments that could be made to account for deficiencies in responses. In one embodiment of the present invention, the adjustment is as follows: (i) if the promised quantity is too small, the balance is either built or procured from another source; (ii) if the promise date is late, no action is taken and the later date is worked into the output plan; and (iii) if the promise date is early, the output plan is adjusted such that any lateness due to the original assumed lead time is eliminated.

The planning coordination system continues at step 68 after all the unprocessed responses are processed. In step 68, the planning coordination system checks whether there are unprocessed demands. If there are no unprocessed demands, the planning coordination system has completed processing and continues at step 52 of FIG. 2. Otherwise, the planning coordination system continues at step 70 where the planning coordination system reads demands received from other factories. In step 72, the planning coordination system provides information to the planning system for adjusting the output plan to accommodate supplying the demands. After the output plan is adjusted, the planning coordination system calculates the quantity and time needed to supply demands in step 74. In step 76, the planning coordination system determines what parts are needed from other factories to supply the products promised to other factories and responses. After step 76, the planning coordination system has completed processing and continues with step 52 in FIG. 2.

Figure 4:
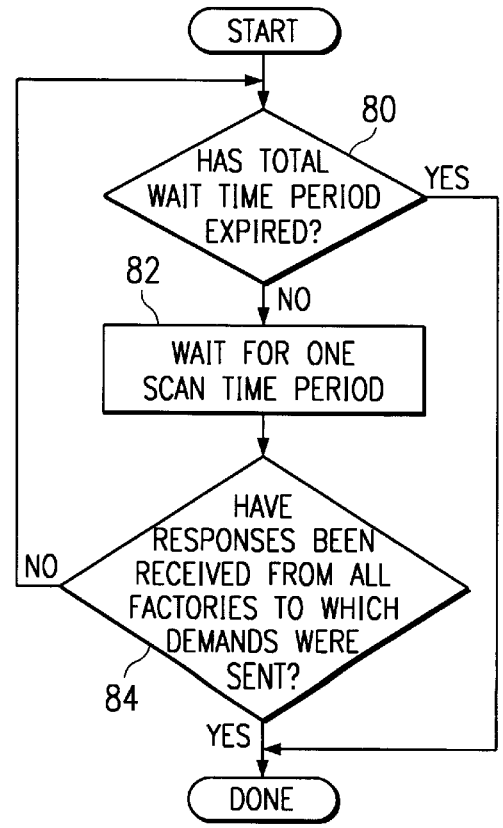
FIG. 4 illustrates a flow chart of a method of waiting for and collecting demands and responses from other factories according to the teachings of the present invention.

FIG. 4 illustrates a flow chart of a method of waiting for and collecting demands and responses from other factories according to the teachings of the present invention. The flow chart of FIG. 4 illustrates in more detail step 54 of FIG. 2. The method of FIG. 4 utilizes two time periods that are set as appropriate for the factory in which the planning coordination system operates. These two time periods are the "wait time period" and the "scan time period."

In step 80, the planning coordination system checks whether a period of time equal to the wait time period has expired. If the wait time period has expired, then the planning coordination system has completed waiting and collecting demands and responses and continues at step 56 of FIG. 2. Otherwise, the planning coordination system continues at step 82.

In step 82, the planning coordination system waits for a period of time equal to one scan time period. The planning coordination system then checks in step 84 whether responses have been received from all factories to which demands were communicated. If all responses have been received, then the planning coordination system has completed waiting and collecting and continues at step 56 of FIG. 2. Otherwise, the planning coordination system continues at step 80.

In this manner, the planning coordination system waits for and collects responses and demands from other factories. This mechanism is robust in that it does not wait for a given factory to respond if the factory fails to respond within a period of time equal to the wait time period. Additionally, this method expedites the coordination activity of the planning coordination system when all of the factories to which demands were communicated respond quickly.

Coordination of factories into a factory network according to the teachings of the present invention allows each factory to demand parts from other factories and for other factories to respond to the demand for parts. Each factory in the network participates in the coordination activity. The factories receive part demands from other factories, generate plans to supply these demands, calculate the produced quantity and time for supplying these parts, and utilize data communications to communicate a response to the demanding factory and to communicate demands to other factories for needed parts. Each factory also participates in the coordination activity by receiving responses to demands the factory has sent and adjusting the factory's output plan according to the responses received from other factories.

A planning coordination system coordinates each factory in the factory network. Each planning coordination system processes demands and responses received from other factories, communicates demands and responses to other factories, and waits for other factories to communicate new demands and responses until a termination condition occurs. A termination condition is set for each planning coordination system such that it is appropriate for the associated planning system. During these iterations, the various factory output plans become more refined. Of course, a steady state may not be reached because a steady state depends upon the characteristics of the planning systems used by each factory and upon changing variables in the manufacturing process.

A factory responding to a demand received from another factory can generate an output plan in the same manner as it would for non-networked customer's request for parts. The difference is that requests from networked factories automatically are provided to the factory's planning system by the planning coordination system. Factories in the factory network may be modeled in a factory's planning system in the manner that a non-networked vendor is modeled.

A plant vendor, however, will respond only to part requests to itself. This feature can be implemented in a variety of ways. A factory may know its own vendor name and look only for part requests matching its name. An alternative is for the factory procuring a part from another factory to have information about to what location to communicate part requests and for the procuring factory to communicate part requests to that factory only to that location.

The coordination of the planning systems of multiple factories into a factory network is a technical advantage of the present invention. Factories can request parts from other factories needed to respond to supply a request. The demand and response chains interrelating the factories can span as many factories and can be organized as necessary.

According to another technical advantage of the present invention, a planning system of a factory is provided with assumed fixed lead times for use in generating output plans when requesting a part from another factory until the other factory responds with a promise date. At the point a promise date is received, the fixed lead time is no longer assumed and the promise date is utilized. Further, each planning system is provided with part number translations to convert part numbers used by other factories to the part number used by the factory with which the planning system is associated.

The teachings of the present invention benefit any product or service production environment. The present invention is useful to coordinate planning systems of factories operated by different companies or of factories operated by the same company. Operations coordinated may include individual or groups of machines, tools, work crews, fixtures, transportation devices, containers, consumed resources, catalyst resources, any other resource, or waste products.

Each planning coordination system in a factory network requires data communication with other planning coordination systems of factories according to the manufacturing chain. In one embodiment of the present invention, the data required by each planning coordination system in the factory network includes: the names and data locations for each factory, the parts obtainable from each factory, the initial lead times to assume until promise dates are communicated, part translations in cases where the factories identify the same part by different names, parameters controlling for what time period to wait for data from other factories and parameters defining when to terminate iterations of processing demand and response communications from other factories.

Planning coordination systems constructed according to the teachings of the present invention propagate demand and response data according to the speed of associated data communication equipment. In one embodiment of the present invention, this data transfer rate is determined by computer servers running the planning coordination system and planning system at each factory. The planning coordination system is independent and separate from the planning system. The planning system maintains the output plan, and the planning coordination system addresses communicating demands and responses.

According to the teachings of the present invention, the planning coordination systems operate to maximize reliability of plans and frequency of adjustments of output plans due to new demands and responses among factories. A factory continues to communicate a demand for parts to another factory after receiving a response from the other factory. The other factory thus continues to generate responses for those demands that it receives and generates responses that reflect any changes that may be required. For example, if a machine breaks, the next response may delay the promise date later than a promise date communicated in an earlier response. Thus, the factories are able to maintain a plan that includes all information available at any point in time.

The planning coordination systems of the present invention operate to coordinate plans of multiple factories where the factories have multiple factories from which to obtain the same part. Each planning coordination system has a list of factories and associated fixed lead times sorted by preference with respect to each of such parts. The fixed lead times are replaced by promise dates received in responses from the factories. The planning coordination system communicates a demand requesting the needed part to the most preferred factory. If the response is satisfactory, a demand is continually communicated to that factory so that the response is held. If the response is unsatisfactory, a demand is communicated to the next preferred factory.

A solid plan is defined as a factory network where no factory has a plan based on procurements from other factories for which a fixed lead time is still assumed. Rather, such procurements have a promise date and a promise quantity communicated in a response from another factory. In one embodiment of the present invention unsatisfactory responses are resolved differently depending upon whether the factories in the factory network have solid plans.

In a case where all factories have a solid plan, quantities of parts needed to compensate for insufficient promised quantities are procured from the next factory on the list. This is accomplished by communicating a demand to the next factory and resuming iterations of processing demands and responses from the other factories until a solid plan is again in place. Of course, the next factory may communicate an unsatisfactory response, in which case this procedure is applied recursively. When a response provides a late promise date, the response is held by continuing to communicate a demand in case no other factory is able to improve on this response. However, a duplicate demand can be communicated to the next factory on the list. If the response from the next factory is better, the earlier procurement is eliminated. Otherwise, the procurement from the second factory is eliminated. If the response from the second factory is better but still late, the process is repeated with respect to the next factory on the list until a satisfactory response is communicated or the list is exhausted.

An alternate approach recognizes that keeping the previous response while exploring other factories consumes materials and capacity that may erroneously reduce the abilities for other factories to supply a better response. Thus, as an alternative, the unsatisfactory response is eliminated, and the other factory is tried. If necessary, the planning coordination system reverts to the retracted response. This approach may be less stable because changes among the various factories may result in a change to previously eliminated responses.

A technical advantage of the present invention includes coordination of output plans for: different sections of a single factory, different factories of the same company, and factories of different companies having supplier-customer relationships. The coordination can be as tight or as loose as the individual planning systems that are coordinated. For example, if each planning system resolves finite material and capacity constraints, the coordinated plans will solve finite material and capacity planning constraints. This ability to expand solutions for finite material and capacity planning constraints from a single planning system to a network of planning systems is an important technical advantage of the present invention.

In one embodiment of the present invention, the planning coordination system at each factory comprises RHYTHM™ INTERPLANT, a software application available from i2 Technologies, Inc. of Dallas, Tex. In this embodiment, each factory in the network is independently running RHYTHM™ MPPS as the planning system, also available from i2 Technologies, Inc. of Dallas, Tex. The planning coordination system provides the ability to coordinate factories operated by the same company or factories operated by different companies having a supplier-customer relationship. This cooperation enhances planning and scheduling performance.

Although the present invention has been described in detail, it should be understood that various changes, substitutions, and alterations can be made hereto without departing from the spirit and scope of the invention as defined by the appended claims.

What is claimed is:

1. A computer-implemented method of using a planning coordination protocol to negotiate demands and responses between a host planning system associated with a first factory with separate planning systems of at least one other factory in a manufacturing chain, the method comprising the steps of:

receiving input demands for a product supplied by said first factory;

delivering output responses for said product;

delivering output demands to said other factory;

receiving input responses from said other factory; and processing each input response by determining if the input response satisfies an associated output demand, and if not, providing data representing the unsatisfied demand to the planning system, and providing an output response that reflects unsatisfied demand;

wherein the processing is iterative such that an exchange of demands and responses results in a predetermined termination condition and wherein the exchange of demands and responses is independent of planning capability data used by the planning systems.

2. The method of claim 1, wherein processing comprises:

reading responses received from the plurality of other factories;

determining whether any response is deficient with respect to an associated demand;

providing information to the planning system for adjusting the output plan according to deficiencies in any response;

reading demands received from the plurality of other factories;

providing information to the planning system for adjusting the output plan to accommodate supplying the demands;

determining a quantity produced and time needed to supply each demand; and determining parts needed from factories in the plurality of other factories.

3. The method of claim 1, wherein receiving demands and responses comprises:

determining whether a total amount of time waiting is equal to a wait time period;

waiting for an amount of time equal to a scan time period if the total amount of time waiting is not equal to the wait time period;

determining whether a response has been received from each factory in the plurality of other factories to which a demand was communicated; and returning to determining unless a response has been received from each factory in the plurality of factories to which a demand was communicated or unless the time waiting is equal to the wait time period.

4. The method of claim 1, wherein the demands include a product number, a due date and a quantity needed data.

5. The method of claim 1, wherein the responses include a product number, a promise date and a quantity promised data.

6. The method of claim 1, wherein the first factory comprises a first manufacturing plant and one factory in the plurality of other factories comprises a second manufacturing plant.

7. The method of claim 1, wherein the first factory comprises a first product group located within a manufacturing plant and the at least one other factory comprises a second product group located within the manufacturing plant.

8. The method of claim 1, wherein the first factory comprises a first machine group located within a manufacturing plant and the at least one other factory comprises a second machine group located within the manufacturing plant.

9. A planning coordination system for providing a protocol to coordinate a planning system of a host factory with separate planning systems of other factories in a manufacturing chain:

a communication system operable:
to receive input demands for a product supplied by said host factory, to communicate output responses indicating a number of said product to be supplied by said host factory, to communicate output demands to a planning coordination system of at least one other factory in the manufacturing chain, and to receive input responses from the planning coordination system of the other factory; and a processing system coupled to the communication system and operable:
to process each said input response to determine if said input response satisfies an associated output demand, and if not, to provide data representing unsatisfied demand to the host planning system, and to provide an output response that reflects the unsatisfied demand;

wherein the communication system and the processing system are iteratively operable, such that an exchange of demands and responses results in a predetermined termination condition and such that the exchange of demands and responses is independent of planning capability data used by the planning system.

10. A computer-implemented method of negotiating demands and responses among plurality of separate factories having separate planning systems in a manufacturing chain, comprising the steps of:

connecting a planning coordination system to an associated planning system in each of a plurality of separate factories in a manufacturing chain;

interconnecting each planning coordination system with other planning coordination systems according to the manufacturing chain;

communicating demands from each planning coordination system to other planning coordination systems, wherein each demand represents a quantity of a product to be provided;

communicating responses from each planning coordination system to other planning coordination systems wherein each response represents promises to supply said product; and iteratively repeating communicating demands and communicating responses such that demand and supply information is automatically communicated between factories having supply and demand part relationships until a predetermined termination condition is reached;

wherein said process of communicating demands and responses is independent of planning capability data used by said planning systems.

11. The method of claim 10, wherein each planning system is associated with a factory that is a manufacturing plant.

12. The method of claim 10, wherein each planning system is associated with a factory that is a product group located within a manufacturing plant.

13. The method of claim 10, wherein each planning system is associated with a factory that is a machine group located within a manufacturing plant.

14. A demand/response negotiation protocol system for a factory network having a plurality of factories in a manufacturing chain, each factory having a separate planning system, the factory network comprising:

a first factory comprising;
a first planning system operable to generate and to adjust a first output plan for the first factory; and
a first planning coordination system coupled to the first planning system, wherein the first planning coordination system is operable to access the first output plan;

a second factory comprising;
a second planning system, separate from the first planning system, operable to generate and to adjust a second output plan for the second factory; and
a second planning coordination system coupled to the second planning system and to the first planning coordination system, wherein the second planning coordination system is operable to access the second output plan;

the first factory and the second factory in a manufacturing chain and having demand and supply part relationships with one other;

the first planning coordination system operable to communicate a demand to the second planning coordination system;

the second planning coordination system operable to receive and process the demand communicated by the first planning coordination system and to communicate a response to the first planning coordination system, wherein the response is based upon the output plan of the second factory;

the first planning coordination system further operable to receive and process the response communicated by the second planning coordination system, so as to determine whether said response meets the demand from the first factory, and to provide data representing the results of the determination to the first planning system;

wherein said first planning coordination system and said second planning coordination system are operable to iteratively exchange demands and responses until a predetermined termination condition is reached, and wherein said exchange of demands and responses is independent of planning capability data used by the planning systems.

15. The factory network of claim 14, wherein the first factory comprises a first manufacturing plant and the second factory comprises a second manufacturing plant.

16. The factory network of claim 14, wherein the first factory comprises a first product group located within a manufacturing plant and the second factory comprises a second product group located within the manufacturing plant.

17. The factory network of claim 14, wherein the first factory comprises a first product group located within a manufacturing plant and the second factory comprises a second machine group located within the manufacturing plant.

18. The factory network of claim 14, wherein the response communicated by the second planning coordination system is based upon fixed lead times for parts needed to fill the response assumed by the second planning system.

* * * * *